(12) United States Patent
Eskolin

(10) Patent No.: US 10,739,605 B2
(45) Date of Patent: Aug. 11, 2020

(54) DISPLAY APPARATUS

(71) Applicant: Nokia Technologies Oy, Espoo (FI)

(72) Inventor: Jan Eskolin, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 15/549,214

(22) PCT Filed: Feb. 2, 2016

(86) PCT No.: PCT/FI2016/050067
§ 371 (c)(1),
(2) Date: Aug. 7, 2017

(87) PCT Pub. No.: WO2016/128614
PCT Pub. Date: Aug. 18, 2016

(65) Prior Publication Data
US 2018/0039091 A1 Feb. 8, 2018

(30) Foreign Application Priority Data
Feb. 9, 2015 (EP) .................................. 15154249

(51) Int. Cl.
G02B 27/28 (2006.01)
H04N 13/30 (2018.01)
G02B 5/30 (2006.01)
G02B 27/00 (2006.01)
G02B 27/01 (2006.01)
G02F 1/1362 (2006.01)

(52) U.S. Cl.
CPC ......... *G02B 27/285* (2013.01); *G02B 5/3083* (2013.01); *G02B 27/0081* (2013.01); *G02B 27/0172* (2013.01); *G02B 27/283* (2013.01); *H04N 13/30* (2018.05); *G02F 1/136277* (2013.01); *G02F 2201/44* (2013.01)

(58) Field of Classification Search
CPC .............. G02B 5/3083; G02B 27/0172; G02B 27/283; G02B 27/285; H04N 13/30
USPC ............................... 359/489.09, 630, 489.08
See application file for complete search history.

(56) References Cited

U.S. PATENT DOCUMENTS 2,958,258 A * 11/1960 Kelly .................. G02B 27/283
348/758
3,704,061 A * 11/1972 Travis ................ G02B 27/1006
359/487.04
(Continued)

FOREIGN PATENT DOCUMENTS

EP 1 647 963 A1 4/2006
JP H 03-113483 5/1991

*Primary Examiner* — Ricky D Shafer
(74) *Attorney, Agent, or Firm* — Harrington & Smith

(57) ABSTRACT

An apparatus including a light source configured to output unpixelated light; an array of reflective pixel control elements configured to selectively reflect incident unpixelated light to produce first pixelated light defining first display content; a pixelated display configured to produce second pixelated light defining second display content; and an optical arrangement configured to direct unpixelated light from the light source to the array of reflective pixel control elements and to combine the pixelated light defining the first display content and the second pixelated light defining the second display content to provide, as an output, third pixelated light defining third display content.

15 Claims, 3 Drawing Sheets

(56) References Cited

U.S. PATENT DOCUMENTS

| | | | | |
|---|---|---|---|---|
| 3,767,290 | A | * | 10/1973 | Lang .................... G02B 27/283 |
| | | | | 359/487.04 |
| 4,647,966 | A | | 3/1987 | Phillips et al. ................. 358/88 |
| 5,526,184 | A | * | 6/1996 | Tokuhashi ............ G02B 27/017 |
| | | | | 359/489.07 |
| 5,596,451 | A | * | 1/1997 | Handschy .......... G02B 27/0172 |
| | | | | 359/633 |
| 5,808,800 | A | * | 9/1998 | Handschy .......... G02B 27/1033 |
| | | | | 349/11 |
| 8,860,831 | B1 | | 10/2014 | Burton et al. ............. 348/217.1 |
| 9,116,337 | B1 | * | 8/2015 | Miao .................. G02B 27/0172 |
| 10,209,611 | B2 | * | 2/2019 | Eskolin .................... G02B 5/30 |
| 2002/0057498 | A1 | * | 5/2002 | Kobayashi ......... G02B 27/0172 |
| | | | | 359/630 |
| 2019/0011704 | A1 | * | 1/2019 | Jarvenpaa ............ G02B 27/283 |

* cited by examiner

DISPLAY APPARATUS

TECHNOLOGICAL FIELD

Embodiments of the present invention relate to a display apparatus.

BACKGROUND

A display apparatus comprises a plurality of pixels (picture elements) which produce pixelated light. By controlling the pixels the display produces different display content.

Different displays have different features. It may be desirable to have an apparatus that has two different types of displays that are used differently.

BRIEF SUMMARY

According to various, but not necessarily all, embodiments of the invention there is provided an apparatus comprising: a light source configured to output unpixelated light; an array of reflective pixel control elements configured to selectively reflect incident unpixelated light to produce first pixelated light defining first display content; a pixelated display configured to produce second pixelated light defining second display content; and an optical arrangement configured to direct unpixelated light from the light source to the array of reflective pixel control elements and to combine the pixelated light defining the first display content and the second pixelated light defining the second display content to provide, as an output, third pixelated light defining third display content.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

Figure 1:
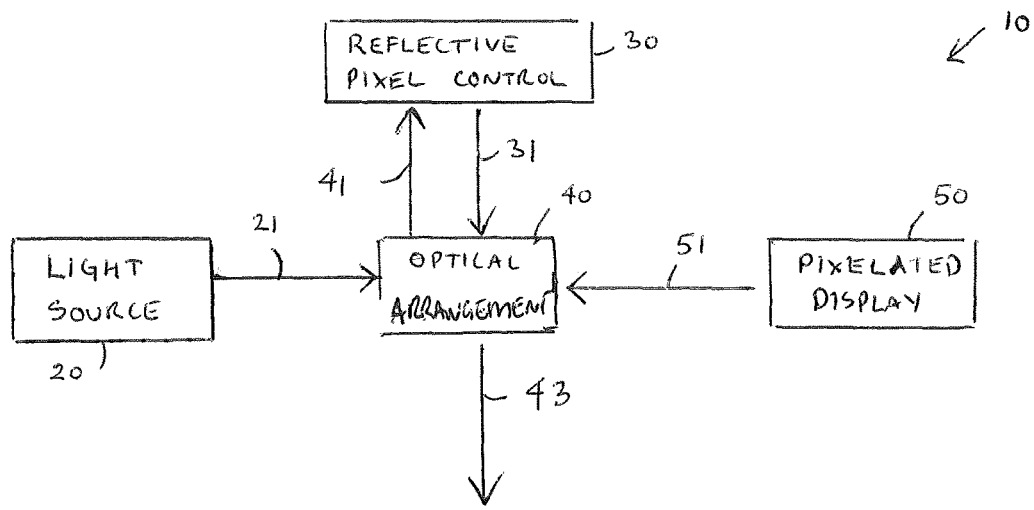
FIG. 1 illustrates an example of a multi-display apparatus.

The Figures illustrate an improved display apparatus that comprises two different displays that both display light through a common optical arrangement 40. The optical arrangement 40 is used to operate a reflective display comprising a light source 20 configured to output unpixelated light 21 and an array of reflective pixel control elements 30 and is also used to combine the output from that display with output from another display 50.

FIG. 1 illustrates an apparatus 10 comprising: a light source 20 configured to output unpixelated light 21; an array of reflective pixel control elements 30 configured to selectively reflect unpixelated light 41 to produce first pixelated light 31 defining first display content; a pixelated display 50 configured to produce second pixelated light 51 defining second display content; and an optical arrangement 40 configured to direct unpixelated light 21 from the light source 20 to the array of reflective pixel control elements 30 and to combine the first pixelated light 31 defining the first display content and the second pixelated light 51 defining the second display content to provide, as an output 43 third pixelated light defining third display content.

Display content comprises a plurality of pixels (picture elements). A pixel is an individually controllable component of the display content. A pixel is limited in size and shape, however, the size and shape of pixels may vary between different apparatus and uses. In some but not all examples, the pixels may have a consistent size and shape. In some examples, the pixels may be dots. The dots may be arranged in a two-dimensional array. In other examples, a pixel may be a segment such as a segment of a seven segment number display. In other examples, a pixel may be a symbol or a graphical icon.

Unpixelated light does not encode display content whereas pixelated light encodes the display content and displays that content when the light is incident on a surface. Each pixel control element in the array of pixel control elements 40 controls a pixel of the first content.

The array 40 may comprise a plurality of regularly spaced pixel control elements arranged in a plane.

Figure 2A:
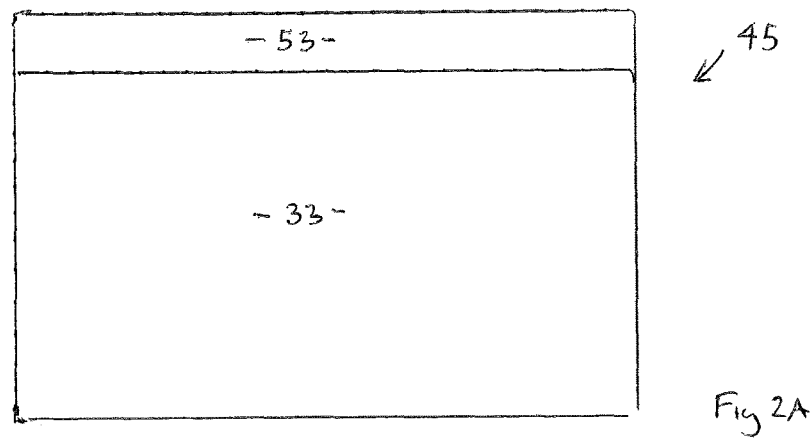
FIGS. 2A and 2B illustrate examples of the third display content in different modes.
Figure 2B:
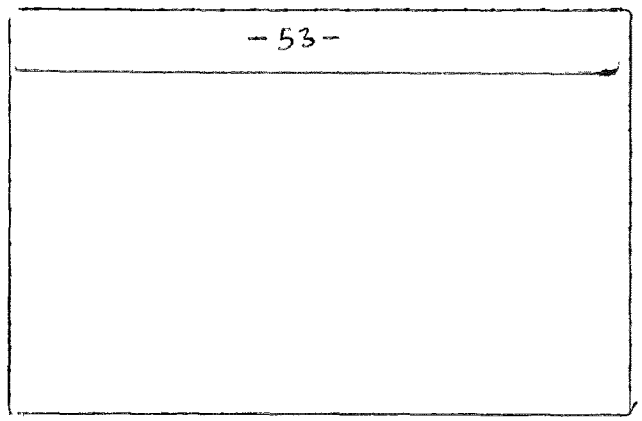

FIGS. 2A and 2B illustrate examples of the first display content 33, the second display content 53 and the third display content 45. The individual pixels are not displayed for clarity.

In FIG. 2A, the apparatus 10 is operated in a first mode of operation, a dual-display mode. The light source 20 and the array of reflective pixel control elements 30 operate to produce first display content 33. The pixelated display 50 operates to produce a second display content 53. The first display content 33 and the second display content 53 are simultaneously included in the third display content 45.

In FIG. 2B, the apparatus 10 is operated in a second mode of operation, a single-display mode. In this mode the light source 20 and the array of reflective pixel control elements 30 are disabled and do not produce first pixelated light 31 defining first display content 33. The third display content 45 does not therefore include any first display content 33. However, in this mode the pixelated display 50 is operational and produces second pixelated light 51 defining second display content 53. The third display content 45 therefore includes only the second display content 53 and does not include any of the first display content 33.

In these examples, the first display content 33 and the second display content are spatially offset so that they do not overlap. However, in other examples the first display content 33 and the second display content 53 may overlap.

The second single-display mode of operation may be a lower power mode of operation in which power is conserved by disabling operation of the light source 20 and/or the reflective pixel control elements 30.

The second content 53 may comprise, for example clock information, timer information, steps taken information, lap time, speed etc.

In a third mode of operation, a single-display mode, the light source 20 and the array of reflective pixel control elements 30 operate to produce first display content 33, as in the first mode. However, the pixelated display 50 is disabled and does not produce the second display content 53. The third display content 45 therefore includes only the first display content 33 and does not include any of the second display content 53.

The optical arrangement 40 may comprise an optical element configured to direct some, but not all, of the unpixelated light 21 from the light source 20 to the array of reflective pixel control elements 30.

Figure 4:
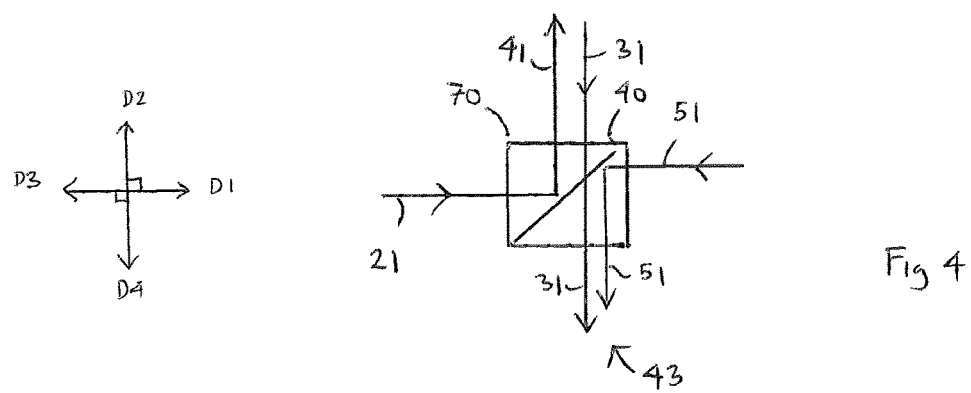
FIG. 4 illustrates operation of examples of an optical arrangement.

For example, as illustrated in FIG. 4, the optical arrangement 40 may comprise or consist of a partially reflective optical element 70 configured to reflect some of the unpixelated light 21 from the light source 20 to the array of reflective pixel control elements 30.

The partially reflective optical element 70 is configured to reflect light incident in a first direction D1 towards a second direction D2 orthogonal to the first direction D1. The partially reflective optical element 70 is thus configured to reflect some of the unpixelated light 21 from the light source 20 to the array of reflective pixel control elements 30 to provide incident unpixelated light 41.

The partially reflective optical element 70 is configured to reflect light incident in a third direction D3 towards a fourth direction D4 orthogonal to the third direction D3. The partially reflective optical element 70 is thus configured to reflect some of the pixelated light 51 from the pixelated display 50 in a direction away from the array of reflective pixel control elements 30 to form the output 43.

The partially reflective optical element 70 is configured to transmit light incident in the fourth direction D4 towards the fourth direction D4. The partially reflective optical element 70 is thus configured to transmit at least some of the first pixelated light 31 produced by the array of reflective pixel control elements 30 to form the output 43.

The partially reflective optical element 70 may, for example be a prism or a beam splitter.

As another example, as illustrated in FIG. 4, the optical arrangement 40 may comprise or consist of an optical element 70 configured to redirect incident light in dependence upon a polarization vector of the light.

For example, the optical element 70 may be configured to direct the unpixelated light 21 having a first polarization vector towards the array of reflective pixel control elements 30 but not direct unpixelated light 21 having a second polarization vector towards the array of reflective pixel control elements 30, where the first polarization vector and the second polarization vector are orthogonal vectors. In some but not necessarily all examples, the first polarization vector may be a transverse electrical (TE) polarization relative to a plane of the array of reflective pixel control elements 30.

An example of such an optical element 70 is a selectively reflective optical element.

A selectively reflective optical element 70 may be configured to reflect light, having the first polarization vector, incident in a first direction D1 towards a second direction D2 orthogonal to the first direction D1 but not reflect light, having the second polarization vector, incident in the first direction D1 towards the second direction D2, instead transmitting light, having the second polarization vector, incident in the first direction D1 in the first direction D1.

The partially reflective optical element 70 is thus configured to reflect the unpixelated light 21 from the light source 20 that has a first polarization vector to the array of reflective pixel control elements 30 to provide incident unpixelated light 41.

The selectively reflective optical element 70 may be configured to reflect incident light, having the first polarization vector, incident in a third direction D3 towards a fourth direction D4 orthogonal to the third direction D3 but not reflect incident light, having the second polarization vector, incident in the third direction D3 towards the fourth direction D4, instead transmitting light, having the second polarization vector, incident in the third direction D3 in the third direction D3.

The selectively reflective optical element 70 is thus configured to reflect the pixelated light 51 from the pixelated display 50 that has a first polarization vector in a direction away from the array of reflective pixel control elements 30 to form the output 43.

The selectively reflective optical element 70 may be configured to reflect incident light, having the first polarization vector, incident in the fourth direction D4 towards the third direction D3 orthogonal to the fourth direction D4 but not reflect incident light, having the second polarization vector, incident in the fourth direction D4 towards the third direction D3, instead transmitting light, having the second polarization vector, incident in the fourth direction D4 in the fourth direction D4.

The selectively reflective optical element 70 is thus configured to transmit the first pixelated light 31 produced by the array of reflective pixel control elements 30 that has a second polarization vector to form the output 43.

The selectively reflective optical element 70 may for example be a broadband polarization beam splitter 70 configured to split incident light into light having a first polarization vector and light having a second polarization vector. The light having the first polarization vector may be redirected in an orthogonal direction while the light having the second polarization vector is through-transmitted. The incident light may, for example, be incident in the first direction D1, the fourth direction D4 or the third direction D3.

Various broadband polarization beam splitters 70 are commercially available. Some are formed by joining two prisms using birefringent thin films at the prism interface.

Figure 3:
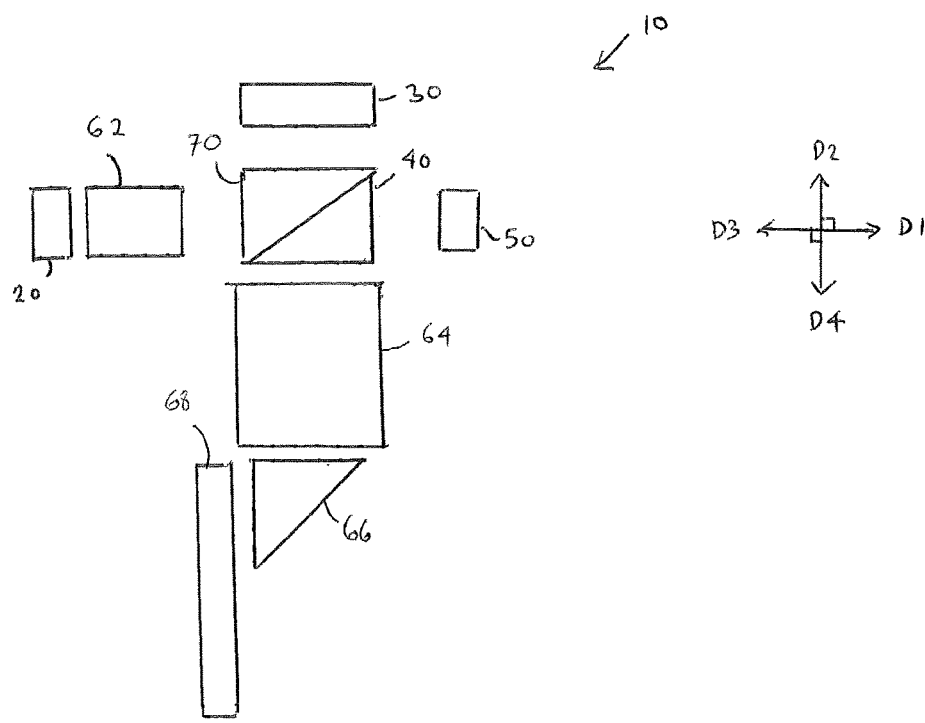
FIG. 3 illustrates an example of the multi-display apparatus.

FIG. 3 illustrates an example of the apparatus 10. This example comprises: a light source 20 configured to output unpixelated light 21; an array of reflective pixel control elements 30 configured to selectively reflect unpixelated light 41 to produce first pixelated light 31 defining first display content 33; a pixelated display 50 configured to produce second pixelated light 51 defining second display content 53; and a polarization beam splitter 70 as the optical arrangement 40. The polarization beam splitter 70 is configured to direct unpixelated light 21 from the light source 20 having a first polarization vector to the array of reflective pixel control elements 30 and to combine the first pixelated light 31 defining the first display content 33 having a second polarization vector and the second pixelated light 51 defining the second display content 53 having a first polarization vector to provide, as an output 43 third pixelated light defining third display content 45. The first polarization vector and the second polarization vector are orthogonal.

In this example, the array of reflective pixel control elements 30 is provided by a liquid crystal on silicon device (LCOS). Such a device comprises a reflective layer and an array of liquid crystal (LC) pixel control elements. The array of LC pixel control elements 30 are able to selectively control reflection of incident light pixel by pixel.

In this example, the pixelated display 50 operates independently to the light source 20. In this example, but not necessarily all examples, the pixelated display 50 is an emissive display. It may, for example, comprise in combination light emitting diodes and a liquid crystal display or it may comprise organic light emitting diodes.

The pixelated display 50 may operate with a lower power consumption than the light source 20 and the array of reflective pixel control elements 30.

In this example, the apparatus 10 provides a near eye display (NED) using an exit pupil expander 68. Light from the light source 20 is collimated by optics 62 before entering the polarizing beam splitter 70 which provides the optical arrangement 40. The output 43 from the optical arrangement 40 is provided to optics 64 and 66 before entering the exit pupil expander 68 to provide a near eye display. The exit pupil expander may be provided by a light guide comprising an in-coupling diffraction grating and a larger out-coupling diffraction grating.

The apparatus 10 may comprise a controller for controlling operation of the light source 20, the array of reflective pixel control elements 30 and the pixelated display 50.

The controller 90 is configured, in a first mode, to simultaneously operate the light source 20, the array of reflective pixel control elements 30, and the pixelated display 50 such that the third display content 45 includes the first display content 33 generated by the light source 20 and the array of reflective pixel control elements 30 and includes the second content 53 generated by the pixelated display 50, as illustrated in FIG. 2A.

The controller 90 is configured, in a second mode, to disable operation of the light source 20 and the array of reflective pixel control elements 30 and operate the pixelated display 50, such that the third display content 45 corresponds to the second display content 53 and does not include any first display content 33, as illustrated in FIG. 2B.

The controller 90 may be configured, in a third mode, to operate the light source 20 and the array of reflective pixel control elements 30 and disable the pixelated display 50, such that the third display content 45 corresponds to the first display content 33 and does not include any second display content 53.

Implementation of a controller 90 may be as controller circuitry. The controller 90 may be implemented in hardware alone, have certain aspects in software including firmware alone or can be a combination of hardware and software (including firmware).

Figure 5:
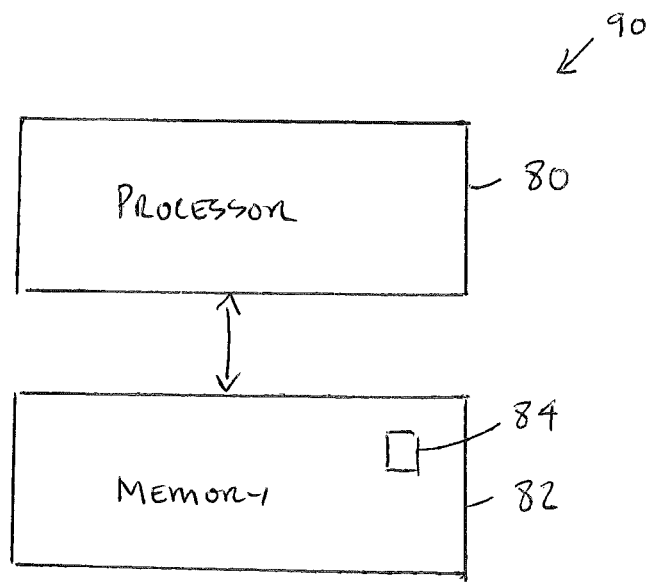
FIG. 5 illustrates an example of a controller.

As illustrated in FIG. 5 the controller 90 may be implemented using instructions that enable hardware functionality, for example, by using executable instructions of a computer program 84 in a general-purpose or special-purpose processor 80 that may be stored on a computer readable storage medium (disk, memory etc) to be executed by such a processor 80.

The processor 80 is configured to read from and write to the memory 82. The processor 80 may also comprise an output interface via which data and/or commands are output by the processor 80 and an input interface via which data and/or commands are input to the processor 80.

The memory 82 stores a computer program 84 comprising computer program instructions (computer program code) that controls the operation of the apparatus 10 when loaded into the processor 80. The computer program instructions, of the computer program 84, provide the logic and routines that enables the apparatus to perform the methods illustrated in FIGS. 2A and 2B. The processor 80 by reading the memory 82 is able to load and execute the computer program 84.

The apparatus 10 therefore comprises:
at least one processor 80; and
at least one memory 82 including computer program code
the at least one memory 82 and the computer program code configured to, with the at least one processor 80, cause the apparatus 10 at least to perform:

selection of a mode of operation and thereby control whether the third content 45 comprises the first content 33 and/or the second content 53.

The selection may, for example, be based upon power consumption.

Figure 6:
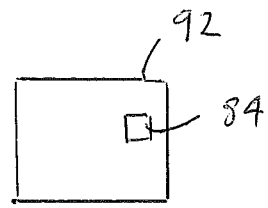
FIG. 6 illustrates an example of a delivery mechanism for a computer program.

As illustrated in FIG. 6, the computer program 84 may arrive at the apparatus 10 via any suitable delivery mechanism 92. The delivery mechanism 92 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 84. The delivery mechanism may be a signal configured to reliably transfer the computer program 84. The apparatus 10 may propagate or transmit the computer program 84 as a computer data signal.

Although the memory 82 is illustrated as a single component/circuitry it may be implemented as one or more separate components/circuitry some or all of which may be integrated/removable and/or may provide permanent/semi-permanent/dynamic/cached storage.

Although the processor 80 is illustrated as a single component/circuitry it may be implemented as one or more separate components/circuitry some or all of which may be integrated/removable. The processor 80 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a light source configured to output unpixelated light;
   an array of reflective pixel control elements configured to selectively reflect incident unpixelated light to produce first pixelated light defining first display content;
   a pixelated display configured to produce second pixelated light defining second display content; and
   an optical arrangement configured to direct the unpixelated light from the light source to the array of reflective pixel control elements and to combine the first pixelated light defining the first display content and the second pixelated light defining the second display content to provide, as an output, third pixelated light defining third display content.

2. The apparatus as claimed in claim 1, wherein the optical arrangement is configured to direct some of the unpixelated light from the light source to the array of reflective pixel control elements.

3. The apparatus as claimed in claim 1, wherein the optical arrangement comprises a partially reflective optical element configured to reflect some of the unpixelated light from the light source to the array of reflective pixel control elements.

4. The apparatus as claimed in claim 3, wherein the partially reflective optical element is configured to:
   reflect light incident in a first direction to a second direction orthogonal to the first direction,
   reflect light incident in a third direction to a fourth direction orthogonal to the third direction, and
   transmit light incident in the fourth direction to the fourth direction,
   wherein the partially reflective optical element is thereby configured to:
   reflect some of the unpixelated light from the light source to the array of reflective pixel control elements,
   reflect some of the pixelated light produced by the pixelated display away from the array of reflective pixel control elements, and
   transmit at least some of the first pixelated light in a direction away from the array of reflective pixel control elements.

5. The apparatus as claimed in claim 1, wherein the optical arrangement is configured to direct unpixelated light having a first polarization, but not unpixelated light having a second polarization, to the array of reflective pixel control elements, wherein the first polarization and the second polarization are in directions orthogonal to one another.

6. The apparatus as claimed in claim 5, wherein the first polarization is a transverse electrical polarization relative to a plane of the array of reflective pixel control elements.

7. The apparatus as claimed in claim 1, wherein the optical arrangement comprises a partially reflective optical element configured to:
   reflect light, having a first polarization, incident in a first direction towards a second direction orthogonal to the first direction,
   reflect light having the first polarization, incident in a third direction towards a fourth direction orthogonal to the third direction, and
   transmit light having a second polarization incident in the fourth direction in the fourth direction.

8. The apparatus as claimed in claim 1, wherein the optical arrangement comprises a broadband polarizing beam splitter configured to split incident light into light having a first polarization and light having a second polarization.

9. The apparatus as claimed in claim 8, wherein the light having the first polarization is redirected and the light having the second polarization is transmitted.

10. The apparatus as claimed in claim 8, wherein the broadband polarizing beam splitter is configured to:
    split light incident in a first direction into light having the first polarization, which is redirected towards a second direction orthogonal to the first direction, and light having the second polarization, which is not re-directed,
    split light incident in a third direction into light having the first polarization, which is redirected towards a fourth direction orthogonal to the third direction, and light having the second polarization, which is not re-directed, and split light incident in the fourth direction into light having the first polarization, which is redirected towards the third direction, and light having the second polarization, which is not re-directed.

11. The apparatus as claimed in claim 1, wherein the array of reflective pixel control elements comprises a liquid crystal on silicon device.

12. The apparatus as claimed in claim 1, wherein the pixelated display is configured to operate independently of the light source.

13. The apparatus as claimed in claim 1, wherein the second display content comprises at least clock information.

14. The apparatus as claimed in claim 1, further comprising a controller configured, in a first mode, to simultaneously operate the light source, the array of reflective pixel control elements, and the pixelated display, such that the third display content includes the first display content generated by the light source and the array of reflective pixel control elements and the second content generated by the pixelated display, and configured to operate in a second mode in which the light source and the array of reflective pixel control elements are disabled and the pixelated display is enabled, such that the third display content corresponds to the second display content.

15. The apparatus as claimed in claim 1 configured as a near eye display.

* * * * *